United States Patent

Azuma

[11] Patent Number: 5,531,650
[45] Date of Patent: Jul. 2, 1996

[54] POWER TRANSMISSION BELT

[75] Inventor: Atsushi Azuma, Hyogo-ku, Japan

[73] Assignee: Bando Chemical Industries, Ltd., Hyogo, Japan

[21] Appl. No.: 501,023

[22] PCT Filed: Dec. 15, 1994

[86] PCT No.: PCT/JP94/02115

§ 371 Date: Aug. 11, 1995

§ 102(e) Date: Aug. 11, 1995

[87] PCT Pub. No.: WO95/16865

PCT Pub. Date: Jun. 22, 1995

[30] Foreign Application Priority Data

Dec. 17, 1993 [JP] Japan .................. 5-317922

[51] Int. Cl.$^6$ ................................. F16G 1/10
[52] U.S. Cl. .......................... 474/260; 474/268
[58] Field of Search .................... 474/260, 263, 474/266–268

[56] References Cited

U.S. PATENT DOCUMENTS

| 3,616,164 | 10/1971 | Tanimoto | 474/263 X |
|---|---|---|---|
| 3,620,897 | 11/1971 | Tanimoto | 474/263 X |
| 5,120,280 | 6/1992 | Mizuno et al. | 474/263 X |
| 5,178,586 | 1/1993 | Mizuno et al. | 474/268 X |
| 5,230,667 | 7/1993 | Nakajima et al. | 474/268 X |
| 5,306,213 | 4/1994 | Nakajima et al. | 474/263 X |
| 5,310,386 | 5/1994 | Mizuno et al. | 474/263 X |
| 5,378,206 | 1/1995 | Mizuno et al. | 474/268 X |
| 5,387,160 | 2/1995 | Nakajima et al. | 474/263 X |

FOREIGN PATENT DOCUMENTS 2-286228  11/1990  Japan .

Primary Examiner—Roger J. Schoeppel
Attorney, Agent, or Firm—Armstsrong, Westerman, Hattori, McLeland & Naughton

[57] ABSTRACT

What is disclosed is a power transmission belt including a laminate composed of an adhesive rubber layer in which core wires are buried and a compressed rubber layer, to the periphery of which being adhered canvas, characterized in that the above-mentioned canvas is impregnated with an aqueous latex composition comprising 2-chloro-1,3-butadiene-2,3-dichloro-1,3-butadiene copolymer latex. The power transmission belt of the present invention does not necessitate any organic solvents and is excellent in thermal resistance, and especially has great adhesion force between the rubber layers and the canvas.

2 Claims, 1 Drawing Sheet 05,531,650

POWER TRANSMISSION BELT

TECHNICAL FIELD

The present invention relates to a power transmission belt.

BACKGROUND ART

Conventionally, power transmission belts have been used for various industrial fields such as industrial machines, automobiles and ships, and canvas, which has been adhered to the periphery of the power transmission belt, has been mainly coated with rubber cement by a spreading method. However, because an organic solvent has been used in the rubber cement, there are some problems such that there is a danger of fire and that environment pollution is generated.

As what can solve the problems which happen in the case that such rubber cement is used, a latex-containing composition aqueous chloroprene rubber latex and carboxylated chloroprene rubber latex has been proposed (Japanese Unexamined Patent Publication No. 15146/1988).

In the case that the above-mentioned latex-containing composition is used, the problems which happen when the rubber cements are used are solved. However, there arise problems that thermal resistance does not become sufficient and adhesion force between a rubber layer and canvas becomes small.

The present invention has been accomplished in consideration of the above-mentioned prior art. The present invention at providing a power transmission belt which does not necessitate an organic solvent, which is excellent in thermal resistance, and especially whose adhesion force between rubber layers and canvas is great.

DISCLOSURE OF THE INVENTION

The present invention relates to a power transmission belt comprising a laminate composed of an adhesive rubber layer in which core wires are buried and a compressed rubber layer, to the periphery of which being adhered canvas, characterized in that the above-mentioned canvas is impregnated with an aqueous latex composition comprising 2-chloro-1,3-butadiene-2,3-dichloro-1,3-butadiene copolymer latex.

BEST MODE FOR CARRYING OUT THE INVENTION

The power transmission belt of the present invention is what comprises a laminate composed of an adhesive rubber layer in which core wires are buried and a compressed rubber layer, to the periphery of which being adhered canvas, characterized in that the above-mentioned canvas is impregnated with an aqueous latex composition comprising 2-chloro-1,3-butadiene-2,3-dichloro-1,3-butadiene copolymer latex.

Hereinafter, the power transmission belt of the present invention will be explained referring to drawings.

Figure 1:
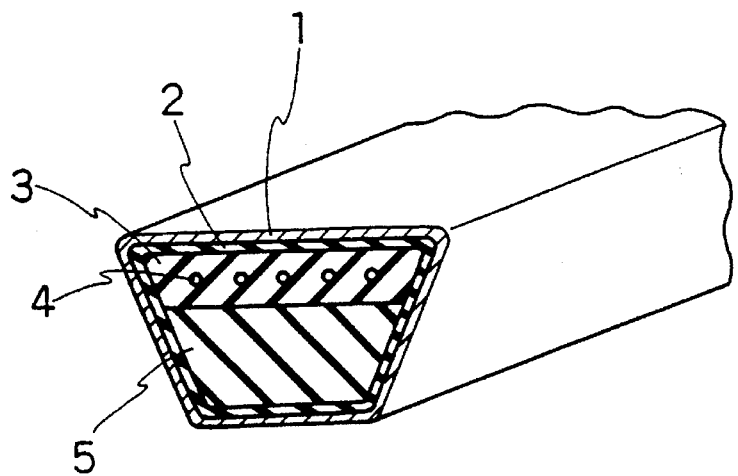
FIG. 1 is a schematic illustrative drawing of a V-belt which is one embodiment of a power transmission belt of the parent invention.

FIG. 1 is a schematic illustrative drawing of a V-belt which is one embodiment of the power transmission belt of the present invention.

In FIG. 1, the adhesive rubber layer 3 in which the core wires 4 are buried and the compressed rubber layer 5 are laminated with each other, and the canvas 1 is adhered to the periphery of the adhesive rubber layer 3 and the compressed rubber layer 5.

The core wire 4 may be what is usually used, and as materials thereof, for instance, polyester, glass, polyamide and the like are cited. It is desired that the diameter of the core wire 4 is usually 0.5 to 2 mm or so. Also, the number of the buried core wire 4 may be suitably adjusted in accordance with the uses of the power transmission belt, and it is desired that the number is usually 4 to 10 or so.

As rubber components used for the adhesive rubber layer 3, in consideration of thermal resistance, dynamic fatigue resistance, adhesive property to the core wire 4 and the like, for instance, chloroprene rubber, hydrogenated acrylonitrile-butadiene rubber, chlorosulfonated polyethylene rubber and the like are desired. It is desired that hardness (Hs) of the adhesive rubber layer 3 is usually 60 to 80 (JIS A) or so, preferably 60 to 70 (JIS A) or so.

As rubber components used for the compressed rubber layer 5, in consideration of thermal resistance, dynamic fatigue resistance, adhesive property to the adhesive rubber layer 3 and the like, for instance, chloroprene rubber, hydrogenated acrylonitrile-butadiene rubber, chlorosulfonated polyethylene rubber and the like are desired. It is desired that hardness (Hs) of the compressed rubber layer 5 is usually 60 to 85 (JIS A) or so, preferably 70 to 85 (JIS A) or so in order to give elasticity thereto.

The above-mentioned adhesive rubber layer 3 and the compressed rubber layer 5 are laminated with each other, and both rubber layers are unified by adhering to each other. The canvas 1 which is impregnated with the aqueous latex composition is adhered to at least partial surface of the laminate composed of the adhesive rubber layer 3 and the compressed rubber layer 5.

As the canvas 1, what are usually used for power transmission belts can be used without especial limitation. As concrete examples of the canvas 1, there are cited, for instance, what are made of a material such as cotton, polyester or polyamide.

Here, the aqueous latex composition comprises the above-mentioned 2-chloro-1,3-butadiene-2,3-dichloro-1,3-butadiene copolymer latex as a main component.

In 2-chloro-1,3-butadiene-2,3-dichloro-1,3-butadiene copolymer which is contained in the above-mentioned 2-chloro-1,3-butadiene-2,3-dichloro-1,3-butadiene copolymer latex, it is desired that the proportion of 2-chloro-1,3-butadiene to 2,3-dichloro-1,3-butadiene (2-chloro-1,3-butadiene-2,3-dichloro-1,3-butadiene: weight ratio) is 50/50 to 95/5, preferably 70/30 to 95/5. When the proportion is smaller than the above-mentioned range, there is a tendency that the improvement of thermal resistance of the obtained power transmission belt becomes insufficient. Also, when the proportion is larger than the above-mentioned range, there is a tendency that the canvas becomes too hard, so that fatigue resistance of the power transmission belt is lowered.

Moreover, in the present invention, there is limitation of the weight average molecular weight of the above-mentioned 2-chloro-1,3-butadiene-2,3-dichloro-1,3-butadiene copolymer.

Also, when the resin solids content of the 2-chloro-1,3-butadiene-2,3-dichloro-1,3-butadiene copolymer latex which is contained in the above-mentioned aqueous latex composition is too large, there is a tendency that adhesion force between the canvas and the rubber layers and thermal resistance of the obtained power transmission belt are lowered. Also, when the resin solids content is too small, there is a tendency that during the forming and processing of the power transmission belt, the forming becomes difficult because tackiness of the canvas is small. Therefore, it is desired that the resin solids content is usually 5 to 50% by weight, preferably 10 to 40% by weight.

As typical examples of the above-mentioned 2-chloro-1, 3-butadiene-2,3-dichloro-1,3-butadiene copolymer latex, there are cited, for instance, Neoprene 400 commercially available from DUPONT . SHOWA DENKO CO., LTD (content of 2-chloro-1,3-butadiene in the copolymer: 85% by weight, resin solids content: 15% by weight) and the like.

In the present invention, the aqueous latex composition may comprise only the above-mentioned 2-chloro-1,3-butadiene-2,3-dichloro-1,3-butadiene copolymer latex. However, in order to strengthen the adhesion to the adhesive rubber layer 3 or the compressed rubber layer 5, it is desired that a vulcanizing agent is mixed into the aqueous latex composition.

As typical examples of the above-mentioned vulcanizing agent, for instance, sulfer, zinc white and the like are cited. However, the present invention is not limited to the exemplified ones. It is desired that the amount of the vulcanizing agent is usually 0.5 to 6 parts (parts by weight, hereinafter referred to the same), preferably 0.5 to 4 parts based upon 100 parts of resin solid matter of the 2-chloro-1,3-butadiene-2,3-dichloro-1,3-butadiene copolymer latex which is contained in the aqueous latex composition. When the amount of the vulcanizing agent is less than the above-mentioned lower limit, there is a tendency that adhesion force to the is more rubber layers becomes small. Also, when the amount than the above-mentioned upper limit, there is a tendency that reactivity becomes too high, so that the processing becomes difficult, and thermal resistance of an obtained power transmission belt is deteriorated.

Moreover, as occasion demands, compounding ingredients which are usually used for rubber cement and the like may be mixed into the above-mentioned aqueous latex composition in a desired amount.

As concrete examples of the above-mentioned compounding ingredient, there are cited, for instance, vulcanization accelerators such as zinc dimethyldithiocarbamate, zinc diethyldithiocarbamate, zinc di-n-butyldithiocarbamate and tetraethylthiuramdisulfide; rubber antioxidants such as p-(p-toluenesulfonylamide)-diphenylamine and N-phenyl-N'-isopropyl-p-phenylenediamine; softening agents such as dioctyl phthalate, dioctyl adipate and sebacate; coloring agents such as carbon black, titanium dioxide, ultramarine blue (standarized in JIS K5112) and lithopone (standarized JIS K5105); fillers such as zinc oxide, calcium carbonate, clay, talc and silica; tackifiers such as cumarone resin, terpene phenol resin, a rosin derivative and a petroleum hydrocarbon resin; dispersing agents such as a formaldehyde condensation product of an alkylallylsulfonic acid salts such as sodium alkylallylsulfonate and a specific polycarboxylate-type dispersing agent; emulsifying agents such as potassium oleate soap and sodium stearate; stabilizers such as a polyoxyethylene alkyl ether and a polyoxyethylene alkylphenyl ether; thickeners such as carboxymethyl cellulose and sodium salt thereof and a sodium polyacrylate; and the like.

When affinity of the above-mentioned compounding ingredient to water is low, it may be heightened, for instance, by a surface active agent and the like. Also, when the compounding ingredient is not dissolved in water, it may be ground by means of a ball mill, a homogenizer or the like and dispersed into the aqueous latex composition.

In the present invention, the canvas 1 may be previously subjected to the impregnating treatment with a treating solution such as an isocyanate compound, an epoxy compound or a RFL solution, which improves adhesive property. When such impregnating treatment is carried out, the canvas 1 and the rubber layers can be more strongly adhered to each other.

The isocyanate compound and the epoxy compound may be what are usually used for canvas of a power transmission belt. When a non-water soluble isocyanate compound or an epoxy compound is used, the compound may be used as a water dispersion. Also, when an isocyanate compound which has high reactivity to water is used, the compound may be used as a block isocyanate. The above-mentioned RFL solution is a treating solution prepared by mixing resorcin-formaldehyde initial condensation product with latex such as chloroprene rubber latex or vinylpyridine-styrene-butadiene copolymer latex, and what has been generally used can be used as it is.

Moreover, as occasion demands, these components may be mixed into the aqueous latex composition.

As a method for impregnating the canvas with the aqueous latex composition, for instance, a soaking method and the like are cited. However, the present invention is not limited only to the method.

Moreover, after the canvas is impregnated with the aqueous latex composition, as occasion demands, the canvas may be dried at a temperature of 50° to 200° C. or so.

The canvas 1 which is impregnated with the aqueous latex composition is adhered to the laminate composed of the adhesive rubber layer 3 and the compressed rubber layer 5.

When the canvas 1 is adhered to the laminate composed of the adhesive rubber layer 3 and the compressed rubber layer 5, in order to more improve adhesive property between the canvas 1 and the above-mentioned laminate, it is desired that an aqueous latex composition layer 2 is formed as shown in FIG. 1 by coating with an aqueous latex composition whose viscosity is more increased than that of the composition with which the canvas 1 is impregnated, for instance, by a soaking method or the like, with for instance, a roll coater, a knife coater of the like.

Also, the canvas 1 may be adhered to all of the surface of the above-mentioned laminate as shown in FIG. 1, and may be adhered to only its partial surface.

Furthermore, when the canvas is adhered to all of the surface of the above-mentioned laminate, it is desired that the adhesion is carried out so that both ends of the canvas are usually overlapped with each other. Also, the canvas may be usually adhered to the laminate in the state of a single layer, and may be adhered thereto in the state of more, for instance, at least double layers.

Moreover, when the amount of the aqueous latex composition impregnated in the canvas 1 is too large, there is a tendency that economics becomes bad. Also, when the amount is too small, there is a tendency that the adhesion between the rubber layers and the canvas becomes insufficient. Therefore, it is desired that the amount is 80 to 480 $g/m^2$, preferably 160 to 320 $g/m^2$ in resin solids content.

After the canvas 1 is set on the laminate composed of the adhesive rubber layer 3 and the compressed rubber layer 5, as occasion demands, vulcanization may be carried out at a temperature of 140° to 200° C. or so.

Figure 2:
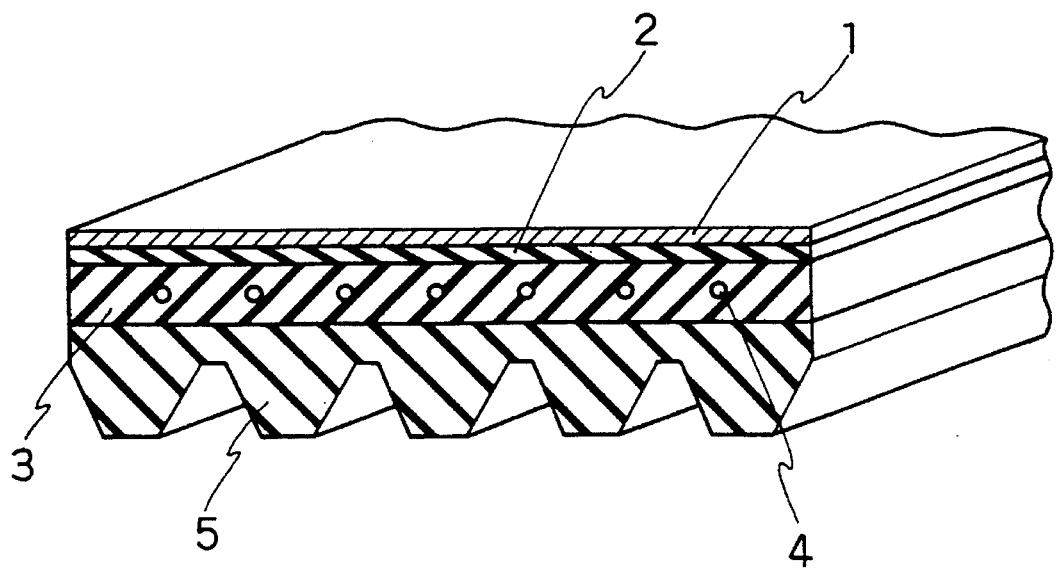
FIG. 2 is a schematic illustrative drawing of a V-ribbed belt which is one embodiment of a power transmission belt of the present invention.

FIG. 2 is a schematic illustrative drawing of a V-ribbed belt which is one embodiment of the power transmission belt of the present invention.

In FIG. 2, the adhesive rubber layer 3 in which the core wires 4 are buried and the compressed rubber layer 5 are laminated with each other, and the canvas 1 is adhered to the upper surface of the adhesive rubber layer 3 through the aqueous latex composition layer 2.

As aforementioned, the power transmission belt of the present invention is explained on the basis of FIG. 1 and FIG. 2. However, it is to be understood that the present invention is not limited to only the embodiments shown in the figures.

Then, the power transmission belt of the present invention is more specifically explained on the basis of Examples. However, the present invention is not limited to only the Examples.

EXAMPLE 1

As 2-chloro-1,3-butadiene-2,3-dichloro-1,3-butadiene copolymer latex, Neoprene 400 commercially available from DUPONT . SHOWA DENKO CO., LTD was used. Into 200 parts of Neoprene 400, was mixed a water dispersion obtained by grinding 10 parts of carbon black FEF, 10 parts of zinc oxide, 2 parts of NOCRAC TD ( commercially available from OUCHI SHINKO CHEMICAL INDUSTRIAL CO., LTD, p-(p-toluenesulfonylamide)-diphenylamine), 1 part of colloidal sulfer, 1 part of NOCCELER BZ ( commercially available from OUCHI SHINKO CHEMICAL INDUSTRIAL CO., LTD, zinc di-n-butyldithiocarbamate), 1 part of NOCCELER TET ( commercially available from OUCHI SHINKO CHEMICAL INDUSTRIAL CO., LTD, tetraethylthiuramdisulfide), 0.75 part of DEMOL N ( commercially available from Kao Corporation, formaldehyde condensation product of alkylallylsulfonate), 0.25 part of EMULGEN 911 ( commercially available from Kao Corporation, polyoxyethylene octylphenyl ether) and 50 parts of ion-exchanged water by means of a ball mill to give an aqueous latex composition.

Then, a sheet of canvas (basic weight: 14.5 g/m$^2$) made of a blended yarn fabric of cotton/polyester fibers (weight ratio: 50/50) was soaked in the obtained aqueous latex composition (impregnated amount: 192 g/m$^2$), and this was dried at 70° C. Then, by means of a knife coater, one side of the canvas 1 was coated with an aqueous latex composition whose viscosity was heightened by further mixing 0.6 part of a thickener (CELLOGEN 3H commercially available from DAI-ICHI KOGYO SEIYAKU CO., LTD., sodium salt of carboxymethyl cellulose) into the above-mentioned aqueous latex composition which was used for soaking ( impregnated amount: 64 g/m$^2$), and the drying was carried out at 70° C. to form an auqeous latex composition layer 2.

Then, as shown in FIG. 1, the canvas 1 was adhered to all of the periphery of a laminate composed of an adhesive rubber layer 3 ( chloroprene rubber, hardness (Hs): 70 (JIS A) ) in which core wires 4 (polyester, diameter: 1 mm) were buried, and a compressed rubber layer 5 (chloroprene rubber, hardness (Hs): 70 (JIS A)) so that the canvas 1 was in contact with the aqueous latex composition layer 2 ( the adhesion was carried out so that both ends of the canvas 1 were overlapped with each other in the width of 20 mm, not shown in FIG. 1), then the vulcanization was carried out at 150° C. for 30 minutes to give a power transmission belt.

Adhesion force between the canvas and the canvas, and adhesion force between the canvas and the rubber layer of the obtained power transmission belt were examined in accordance with the following method. The results are shown in Table 1.

(Adhesion force)

The overlapped portion between the canvas and the canvas or the adhered portion between the canvas and the rubber layer was cut out in a fixed width, and with STROGRAPH (commercially available from TOYO SEIKI SEISAKUSHO, LTD., tensile tester), peeling test was carried out at a tensile speed of 50 mm/minute at room temperature (25° C.) or at a sensitive temperature (120° C.), then adhesive strength (kg/cm) was measured.

Comparative Example 1

In Example 1, a power transmission belt was obtained in the same manner as in Example 1 except that 200 parts of DENKA CHLOROPRENE LM-50 commercially available from DENKI KAGAKU KOGYO KABUSHIKI KAISHA (resin solids content: 50% by weight) was used as polychloroprene latex instead of 200 parts of Neoprene 400 which was 2-chloro-1,3-butadiene-2,3-dichloro-1,3-butadiene copolymer latex.

Adhesion force between the canvas and the canvas, and adhesion force between the canvas and the rubber layer of the obtained power transmission belt were examined in the same manner as in Example 1. The results are shown in Table 1.

Comparative Example 2

With 100 parts of polychloroprene were mixed 35 parts of carbon black FEF, 15 parts of dioctyl phthalate, 2 parts of N-phenyl-N'-isopropyl-p-phenylenediamine, 1 part of stearic acid, 4 parts of magnesium oxide, 5 parts of zinc oxide and 10 parts of Nipsil VN-3 (silica), and they were headed with a banbury mixer. The kneaded compound was dissolved in toluene to prepare rubber cement.

Then, the same canvas as used in Example 1 was soaked in 10% toluene solution of the above-mentioned rubber cement. After this was dried at 80° C., one side of the canvas was coated with a 20% toluene solution of the above-mentioned rubber cement by means of a knife coater. Then, its drying was carried out at 80° C. to give a rubber cement-spreaded canvas (impregnated amount of polychloroprene: 65 g/m$^2$).

The obtained rubber cement-spreaded canvas was rolled up round all of the periphery of the same laminate as used in Example 1 so that the surface on which the rubber cement was coated was in contact with the laminate, and the vulcanization was carried out at 150° C. for 30 minutes to give a power transmission belt.

Adhesion force between the canvas and the canvas, and adhesion force between the canvas and the rubber layer of the obtained power transmission belt were examined in the same manner as in Example 1. The results are shown in Table 1.

TABLE 1

| | Adhesion force (adhesive strength (kg/cm)) | | | |
|---|---|---|---|---|
| | Between canvas and and canvas | | Between canvas and rubber layer | |
| | Room temperature (25° C.) | Sensitive temperature (120° C.) | Room temperature (25° C.) | Sensitive temperature (120° C.) |
| Example No. | | | | |
| 1 | 4.8 | 1.2 | 4.3 | 1.1 |

TABLE 1-continued

| | Adhesion force (adhesive strength (kg/cm)) | | | |
|---|---|---|---|---|
| | Between canvas and canvas | | Between canvas and rubber layer | |
| | Room temperature (25° C.) | Sensitive temperature (120° C.) | Room temperature (25° C.) | Sensitive temperature (120° C.) |
| Comparative Example | | | | |
| 1 | 1.8 | 0.6 | 2.6 | 0.5 |
| 2 | 3.6 | 1.2 | 3.5 | 1.1 |

From the results shown in Table 1, it can be seen that at a sensitive temperature, the power transmission belt obtained in Example 1 is excellent in adhesion force between the canvas and the canvas and adhesion force between the canvas and the rubber layer, as well as the power transmission belt obtained by using the conventional organic solvent (toluene) in Comparative Example 2, and that at room temperature, the power transmission belt obtained in Example 1 is more excellent in adhesion force than the power transmission belt of Comparative Example 2.

Also, it can be seen that in comparison with the power transmission belt obtained by using the conventional aqueous latex composition in Comparative Example 1, the power transmission belt obtained in Example 1 is extremely excellent in adhesion force between the canvas and the canvas and adhesion force between the canvas and the rubber layer at any of room temperature and a sensitive temperature.

Furthermore, since the power transmission belt obtained in Example 1 is excellent in adhesion force at high temperatures such as 120° C., it can be seen that the power transmission belt is excellent in thermal resistance.

INDUSTRIAL APPLICABILITY

The power transmission belt of the present invention is not in danger of flaming, and moreover has no problem such as generation of environment pollution because the belt is produced without any organic solvents.

Also, since the power transmission belt of the present invention is excellent in thermal resistance and especially excellent in adhesion force between the rubber layers and the canvas, it can be preferably used as various power transmission belts to which great stress is applied.

I claim:

1. A power transmission belt comprising a laminate composed of an adhesive rubber layer in which core wires are buried and a compressed rubber layer, to the periphery of which being adhered canvas, characterized in that the above-mentioned canvas is impregnated with an aqueous latex composition comprising 2-chloro-1,3-butadiene-2,3-dichloro-1,3-butadiene copolymer latex.

2. The power transmission belt of claim 1, wherein a vulcanizing agent is mixed into the aqueous latex composition.

* * * * *